United States Patent
Couch et al.

(10) Patent No.: US 9,929,633 B2
(45) Date of Patent: Mar. 27, 2018

(54) SUBMODULE IDENTIFICATION IN A MODULAR MULTILEVEL CONVERTER BY MEANS OF MEASURING SIGNAL PROPAGATION TIMES FROM THE CENTRAL CONTROLLER

(71) Applicant: General Electric Technology GmbH, Baden (CH)

(72) Inventors: Philip Robin Couch, Honiton Devon (GB); Timothy James Stott, Staffordshire (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/025,766

(22) PCT Filed: Sep. 29, 2014

(86) PCT No.: PCT/EP2014/070830
§ 371 (c)(1),
(2) Date: Mar. 29, 2016

(87) PCT Pub. No.: WO2015/044432
PCT Pub. Date: Apr. 2, 2015

(65) Prior Publication Data
US 2016/0241125 A1  Aug. 18, 2016

(30) Foreign Application Priority Data
Sep. 30, 2013 (EP) .................................... 13275232

(51) Int. Cl.
*H02M 1/08* (2006.01)
*H02M 7/483* (2007.01)
(Continued)

(52) U.S. Cl.
CPC ............. *H02M 1/08* (2013.01); *H02M 7/483* (2013.01); *H04B 10/0793* (2013.01);
(Continued)

(58) Field of Classification Search
CPC .......... H02J 1/102; H02J 3/46; H02M 3/1584; H02M 3/285; H02M 3/33561;
(Continued)

(56) References Cited

U.S. PATENT DOCUMENTS

| 5,541,914 A * | 7/1996 | Krishnamoorthy ... H04L 49/254 370/427 |
| 8,400,796 B2 * | 3/2013 | Dofnas ................. H02M 7/483 363/39 |

(Continued)

FOREIGN PATENT DOCUMENTS

| CN | 1585902 A | 2/2005 |
| CN | 102055523 | 5/2011 |

(Continued)

OTHER PUBLICATIONS

English-language machine translation of DE 10103031, Marquardt Rainer (dated Jul. 25, 2002).
(Continued)

*Primary Examiner* — Jue Zhang
*Assistant Examiner* — Kevin H Sprenger
(74) *Attorney, Agent, or Firm* — GE Global Patent Operation; Scott R. Stanley

(57) ABSTRACT

An electrical apparatus comprises a chain-link converter which includes a plurality of chain-link sub-modules each of which is operable to provide a voltage source. The electrical apparatus also includes a switching control unit to control the chain-link sub-modules. The switching control unit is operatively interconnected with each chain-link sub-module by an electromagnetic radiation conduit. The length of the
(Continued)

electromagnetic radiation conduit between the switching control unit and at least one chain-link sub-module differs from the length of the electromagnetic radiation conduit between the switching control unit and at least one other chain-link sub-module. The switching control unit is configured to discern a difference in the time taken for an electromagnetic signal to propagate through each different-length electromagnetic radiation conduit to thereby identify the or each chain-link sub-module associated with each different-length electromagnetic radiation conduit.

11 Claims, 3 Drawing Sheets

(51) Int. Cl.
  *H04B 10/079* (2013.01)
  *H02J 3/18* (2006.01)
  *H02M 1/00* (2006.01)

(52) U.S. Cl.
  CPC .... *H02J 3/1857* (2013.01); *H02M 2001/0003* (2013.01); *H02M 2007/4835* (2013.01); *Y02E 40/12* (2013.01); *Y02E 40/16* (2013.01); *Y02E 40/26* (2013.01)

(58) Field of Classification Search
  CPC ........... H02M 3/33569; H02M 3/3376; H02M 3/33523; H02M 7/493; H02M 7/49; H02M 7/53806; H02M 7/537; H02M 7/003; H02M 7/5387; H02M 7/538; H02M 7/53871; Y02B 70/126
  USPC ................ 363/65, 71–72, 131–132
  See application file for complete search history.

(56) References Cited

U.S. PATENT DOCUMENTS

| | | | |
|---|---|---|---|
| 9,372,493 | B2 * | 6/2016 | Aiello |
| 2004/0247316 | A1 | 12/2004 | Soto et al. |
| 2005/0019031 | A1 | 1/2005 | Ye et al. |
| 2005/0031347 | A1 | 2/2005 | Soto et al. |
| 2005/0032347 | A1 | 2/2005 | Hase et al. |
| 2009/0052897 | A1 | 2/2009 | Kazawa et al. |
| 2014/0049230 | A1 * | 2/2014 | Weyh .................... H02M 7/483 323/207 |

FOREIGN PATENT DOCUMENTS

| | | |
|---|---|---|
| DE | 10103031 | 7/2002 |
| EP | 2 549 634 A1 | 1/2013 |
| EP | 2 884 825 A1 | 6/2015 |
| FR | 2899971 A1 | 10/2007 |
| GB | 2 056 822 A | 3/1981 |
| GB | 2 294 821 | 5/1996 |
| JP | 2003-255203 | 9/2003 |
| JP | 2007-010918 | 1/2007 |
| JP | 2011-221083 | 11/2011 |
| WO | WO-2004/079404 | 9/2004 |
| WO | WO-2005/019970 | 3/2005 |
| WO | WO-2006/085928 | 8/2006 |

OTHER PUBLICATIONS

English-language machine translation of CN 102055523, China Mobile Group Jiangsu Branch Co Ltd (dated May 11, 2011).
English-language machine translation of JP 2003-255203, Fujikura Ltd (dated Sep. 10, 2003).
English-language machine translation of JP 2007-010918, Sumitomo Electric Industries, Nippon Telegraph & Telephone (dated Jan. 18, 2007).
English-language machine translation of JP 2011-221083, Fujikura Ltd (dated Nov. 4, 2011).
International Search Report and Written Opinion, PCT/EP2014/070830, Alstom Technology Ltd., 11 pages (dated Feb. 2, 2015).
English-language machine translation of FR 2899971, Inst Francais Du Petrole, 8 pages (dated Oct. 19, 2007).
First Office Action and search issued in connection with corresponding CN Application No. 201480065270.9 dated Sep. 29, 2017.

* cited by examiner

SUBMODULE IDENTIFICATION IN A MODULAR MULTILEVEL CONVERTER BY MEANS OF MEASURING SIGNAL PROPAGATION TIMES FROM THE CENTRAL CONTROLLER

CROSS-REFERENCE TO RELATED APPLICATIONS

The present application is a National Stage of International Application No. PCT/EP2014/070830, filed Sep. 29, 2014, which claims the benefit of and priority to European Application No. 13275232, filed Sep. 30, 2013, which is incorporated herein by reference in its entirety.

This invention relates to an electrical apparatus comprising a chain-link converter and a switching control unit, and to a method of identifying the location of a chain-link sub-module in such an electrical apparatus.

One or more chain-link converters are often utilised in Voltage Source Converters, (VSC) such as those used to transmit direct current (DC) power or in static compensators (STATCOM).

A typical voltage source converter is shown schematically in FIGS. 1, 2(a) and 2(b). The voltage source converter 10 includes first and second DC terminals 12, 14 between which extends a converter limb 16. Other voltage source converters may include more than one converter limb 16 and, in particular, may include three converter limbs each of which corresponds to a given phase of a three-phase electrical power system.

The converter limb 16 includes first and second limb portions 18, 20 which are separated by an alternating current (AC) terminal 22.

In use the first and second DC terminals 12, 14 are respectively connected to positive and negative terminals of a DC network, and the AC terminal 22 is connected to an AC network.

Each limb portion 18, 20 includes a chain-link converter 24 which extends between the AC terminal 22 and a corresponding one of the first or the second DC terminal 12, 14. Each chain-link converter 24 includes a plurality of series connected chain-link modules 26, and each chain-link module 26 in turn includes a plurality of, e.g. eight, series connected chain-link sub-modules 28.

Each chain-link sub-module 28 includes a number of switching elements 30 which are connected in parallel with an energy storage device in the form of a capacitor 32. In the arrangements shown each switching element 30 includes a semiconductor device 34 in the form of, e.g. an Insulated Gate Bipolar Transistor (IGBT), which is connected in parallel with an anti-parallel diode 36. It is, however, possible to use other semiconductor devices.

FIG. 2(a) shows an example first chain-link sub-module 28 in which first and second pairs 38, 40 of switching elements 30 and a capacitor 32 are connected in a known full bridge arrangement to define a 4-quadrant bipolar module. Switching of the switching elements 30 selectively directs current through the capacitor 32 or causes current to bypass the capacitor 32 such that the first sub-module 28 can provide zero, positive or negative voltage and can conduct current in two directions.

FIG. 2(b) shows an example second chain-link sub-module 28 in which only a first pair 38 of switching elements 30 is connected in parallel with a capacitor 32 in a known half-bridge arrangement to define a 2-quadrant unipolar module. In a similar manner to the first chain-link sub-module 28, switching of the switching elements 30 again selectively directs current through the capacitor 32 or causes current to bypass the capacitor 32 such that the second sub-module 28 can provide zero or positive voltage and can conduct current in two directions.

In this manner it is possible to build up a combined voltage across each chain-link module 26, via the insertion of the capacitors 32 of multiple chain-link sub-modules 28 (with each sub-module 28 providing its own voltage), which is higher than the voltage available from each individual sub-module 28.

Moreover, it is similarly possible to build up a combined voltage across each chain-link converter 24 by combining the individual voltage available from each chain-link module 26.

Accordingly, each of the chain-link modules 26 and its associated chain-link sub-modules 28 work together to permit the chain-link converter 24 to provide a stepped variable voltage source. This permits the generation of a voltage waveform across each chain-link converter 24 using a step-wise approximation. Operation of each chain-link converter 24 in this manner can be used to generate an AC voltage waveform at the AC terminal 22, and thereby enable the voltage source converter 10 to provide the aforementioned power transfer functionality between the AC and DC networks.

In order for the generated waveform to approximate an AC waveform to a desired extent it is often necessary for each chain-link converter 24 to include many hundred chain-link modules 26 and, in turn, typically several thousand chain-link sub-modules 28. Each sub-module 28 is often individually identifiable by way of a unique serial number which is created during manufacture of the sub-module 28 and typically is displayed on a serial number label affixed to an exterior of the sub-module 28.

Each of the sub-modules 28 is arranged in communication with a control unit via a network (not shown) of discrete electromagnetic radiation conduits.

It is well known that in order for such a network to perform efficiently it is desirable for the electromagnetic radiation conduit between the control unit and each respective sub-module 28 to have the same length.

From time to time the switching elements 30 and/or capacitor 32 in a chain-link sub-module 28 may fail such that it becomes necessary to repair or replace a given sub-module 28. Under such circumstances it then becomes necessary to physically locate the sub-module 28 within the associated chain-link converter 24. Since the operation of each sub-module 28 is independent of its location within a chain-link converter 24 there is no need for each sub-module to be aware of its physical location within the chain-link converter 24 in order to function normally. As a result no such sub-module 28 is able, automatically, to provide details of its physical location to, e.g. an associated control system.

Meanwhile, the very large number of such sub-modules 28 in, e.g. a typical voltage source converter 10, means that having a maintenance operator visually inspect each serial number label to identify a defective sub-module 28 is very time-consuming. This is especially so since the sub-modules 28 are normally inaccessible from ground level so as to ensure their respective isolation from ground.

In addition, it is not practical to pre-allocate a physical location of a sub-module 28 within such a chain-link converter 24, e.g. during manufacture of the sub-module, because vagaries in a manufacturer-to-site shipping process mean that a particular sub-module 28 may be delayed or damaged which might otherwise hold up on-going installation of the chain-link converter 24.

A number of attempts have been made to alleviate the aforementioned difficulties in physically locating a sub-module 28 within a chain-link converter 24.

One example is the creation, during installation of a chain-link converter 24, of an electronic or paper file in which the physical location of each sub-module 28 is recorded against its serial number.

Each sub-module 28 may also be locally programmed, e.g. by way of various switch settings, with its physical location as part of an initial installation process.

However, each of the foregoing attempted solutions requires a human operative to create and keep up to date the necessary physical location information. As such these processes are prone to human error, and so often it becomes necessary to carry out the time-consuming visual inspection mentioned above.

There is a need, therefore, for an improved means of physically locating one or more sub-modules within a chain-link converter which minimises the risk of human error occurring, and so reduces the likelihood of a time-consuming visual inspection being required.

According to a first aspect of the invention there is provided an electrical apparatus comprising:

a chain-link converter including a plurality of chain-link sub-modules each of which is operable to provide a voltage source; and a switching control unit to control the chain-link sub-modules, the switching control unit being operatively interconnected with each chain-link sub-module by an electromagnetic radiation conduit, the length of the electromagnetic radiation conduit between the switching control unit and at least one chain-link sub-module differing from the length of the electromagnetic radiation conduit between the switching control unit and at least one other chain-link sub-module, and the switching control unit being configured to discern a difference in the time taken for an electromagnetic signal to propagate through each different-length electromagnetic radiation conduit to thereby identify the or each chain-link sub-module associated with each different-length electromagnetic radiation conduit.

The inclusion of at least two different-length electromagnetic radiation conduits allows the switching control unit to identify the or each chain-link sub-module associated with a given different-length electromagnetic radiation conduit according to the time taken for the electromagnetic signal to propagate through the given electromagnetic radiation conduit. Thus the switching control unit is able to identify the or each said chain-link sub-module without any human intervention.

Moreover it is possible, e.g. during installation of a given chain-link converter, to select the respective lengths of at least two different-lengths of electromagnetic radiation conduit so that each length corresponds to the spatial arrangement of the or each corresponding chain-link sub-module within a predetermined connection layout of the chain-link converter, such that likewise no human intervention is required in determining at least the approximate physical location of the or each said corresponding chain-link sub-module within the chain-link converter.

Accordingly, it is possible to physically locate a given chain-link sub-module without the need for any intervention by a human operative, and so the likelihood of a time-consuming visual inspection being required is much reduced.

Preferably each chain-link sub-module is operatively interconnected with the switching control unit by an electromagnetic radiation conduit which has a different length to each of the other electromagnetic radiation conduits.

Such an arrangement provides the option of the switching control unit being able to physically locate each individual chain-link sub-module within a chain-link converter. Such an arrangement is thereby able to reduce further the time taken for a maintenance operative to physically locate (and hence repair or replace) a given sub-module.

Optionally the chain-link sub-modules are arranged in respective groups each of which group defines a chain-link module, the electromagnetic radiation conduits extending between the switching control unit and each respective chain-link module being arranged in a corresponding group of electromagnetic radiation conduits, and the length of each electromagnetic radiation conduit within a respective said group of electromagnetic radiation conduits falling within a discrete range of lengths which differs from the discrete range of lengths of the electromagnetic radiation conduits within the or each other group of electromagnetic radiation conduits.

Having the length of each electromagnetic radiation conduit within a given group of electromagnetic radiation conduits associated with a respective chain-link module fall within a discrete range of lengths helps to maintain uniformity in the extent to which the said lengths correspond to the spatial arrangement of the corresponding chain-link sub-modules in the chain-link converter, i.e. correspond to the physical layout of the chain-link converter.

In a preferred embodiment of the invention the chain-link sub-modules are arranged in respective groups each of which group defines a chain-link module, the electromagnetic radiation conduits extending between the switching control unit and each respective chain-link module being arranged in a corresponding group of electromagnetic radiation conduits, the electromagnetic radiation conduits within a respective said group of electromagnetic radiation conduits having the same length which differs from the length of the electromagnetic radiation conduits within the or each other group of electromagnetic radiation conduits.

The inclusion, within a given group of electromagnetic radiation conduits associated with a respective chain-link module, of electromagnetic radiation conduits which are all the same length simplifies installation of the chain-link module since there is no requirement to distinguish between individual electromagnetic radiation conduits destined for a particular chain-link module during such installation. Nevertheless, such an arrangement still allows the switching control unit to pinpoint the physical location of each sub-module to within a particular chain-link module.

Each electromagnetic radiation conduit may include a unique visual identifier. Such an identifier helps to ensure during installation that each electromagnetic radiation conduit is correctly interconnected between, e.g. the correct chain-link module or chain-link sub-module and a corresponding correct connection terminal in the switching control unit.

Preferably the electromagnetic radiation conduits in each respective group of electromagnetic radiation conduits shares a common visual identifier, the common visual identifier of one group differing from the common visual identifier of the or each other group of electromagnetic radiation conduits.

Such an arrangement conveniently assists in correctly interconnecting the switching control unit and the sub-modules of a given chain-link module.

In another preferred embodiment of the invention each electromagnetic radiation conduit includes a first conduit portion operatively connected to the switching control unit and a second conduit portion extending towards a corresponding chain-link sub-module, whereby the second conduit portions have the same length as one another while each first conduit portion has a length selected to define the difference in overall length of the given electromagnetic radiation conduit relative to one or more other electromagnetic radiation conduits.

Including second conduit portions which have the same length simplifies the installation of the second conduit portions between each chain-link sub-module and, e.g. a conduit housing which is common to each of the chain-link sub-modules.

Optionally each first conduit portion includes a main portion and an interconnecting portion, the main portions having the same length as one another while each interconnecting portion has a length selected to define the difference in overall length of the corresponding electromagnetic radiation conduit relative to one or more other electromagnetic radiation conduits.

Such an arrangement further simplifies the installation of the main portions, e.g. between the switching control unit and a conduit housing common to each chain-link sub-module, while the various different-length interconnecting portions can be readily located in said conduit housing.

Preferably each chain-link module includes at least one fault indicator. Such a fault indicator, e.g. a visual and/or audible fault indicator, usefully assists a maintenance operative in physically locating a faulty chain-link module once he or she has been directed to the correct region of a chain-link converter.

In a still further preferred embodiment of the invention each chain-link sub-module includes a fault indicator. Such an arrangement assists a maintenance operative in readily physically locating a faulty chain-link sub-module.

According to a second aspect of the invention there is provided a method of identifying the location of a chain-link sub-module in an electrical apparatus comprising a chain-link converter having a plurality of chain-link sub-modules each of which is operable to provide a voltage source and a switching control unit to control the chain-link sub-modules, the method comprising the steps of:
(a) operatively interconnecting an electromagnetic radiation conduit between the switching control unit and each chain-link sub-module, the length of the electromagnetic radiation conduit between the switching control unit and at least one chain-link sub-module differing from the length of the electromagnetic radiation conduit between the switching control unit and at least one other chain-link sub-module;
(b) propagating an electromagnetic signal through a given electromagnetic radiation conduit;
(c) determining the time taken for the electromagnetic signal to propagate through the given electromagnetic radiation conduit; and
(d) identifying the location of the or each chain-link sub-module associated with the given electromagnetic radiation conduit according to the time taken for the electromagnetic signal to propagate through the given electromagnetic radiation conduit.

The method of the invention shares the benefits of the corresponding features of the electrical apparatus of the invention, as indicated hereinabove.

There now follows a brief description of preferred embodiments of the invention, by way of non-limiting example, with reference being made to the following figures in which.

Figure 1:
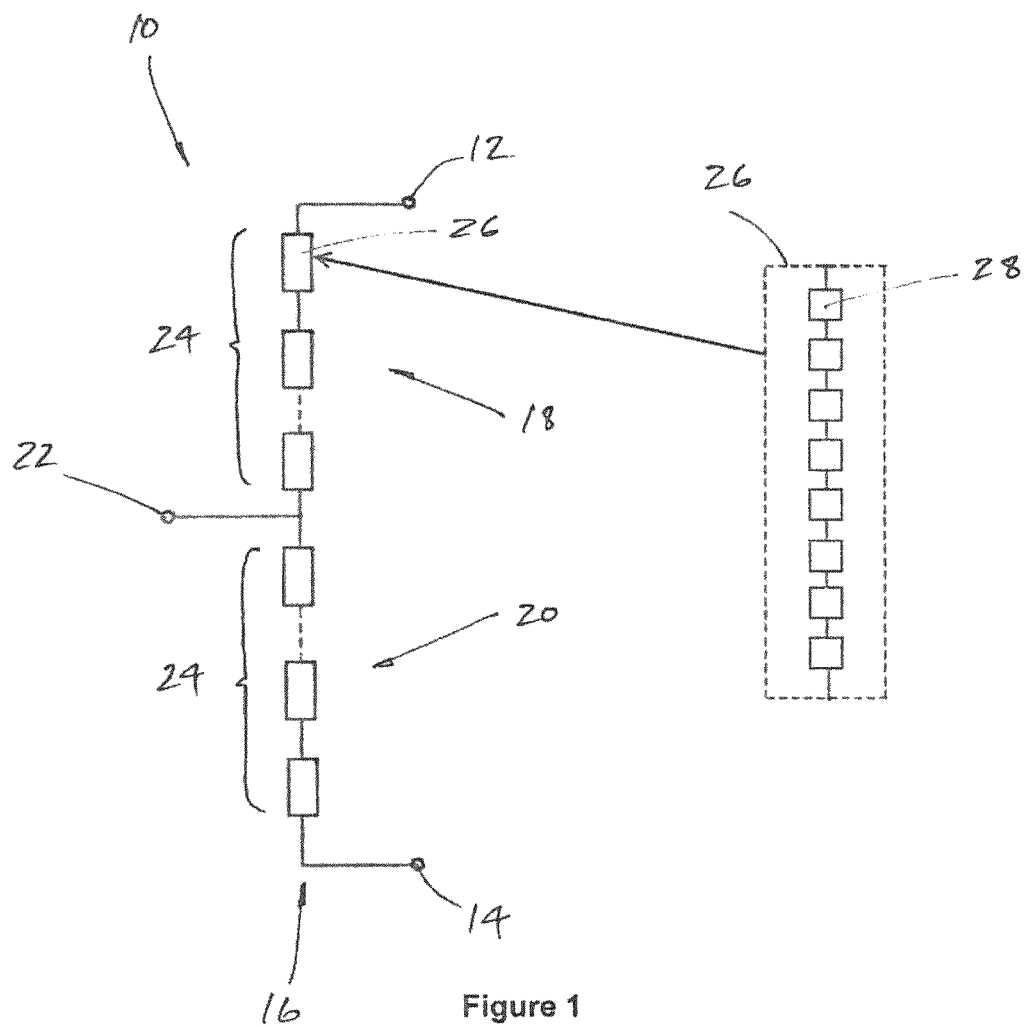
FIG. 1 shows a schematic view of a conventional voltage source converter including first and second chain-link converters.
Figure 2A:
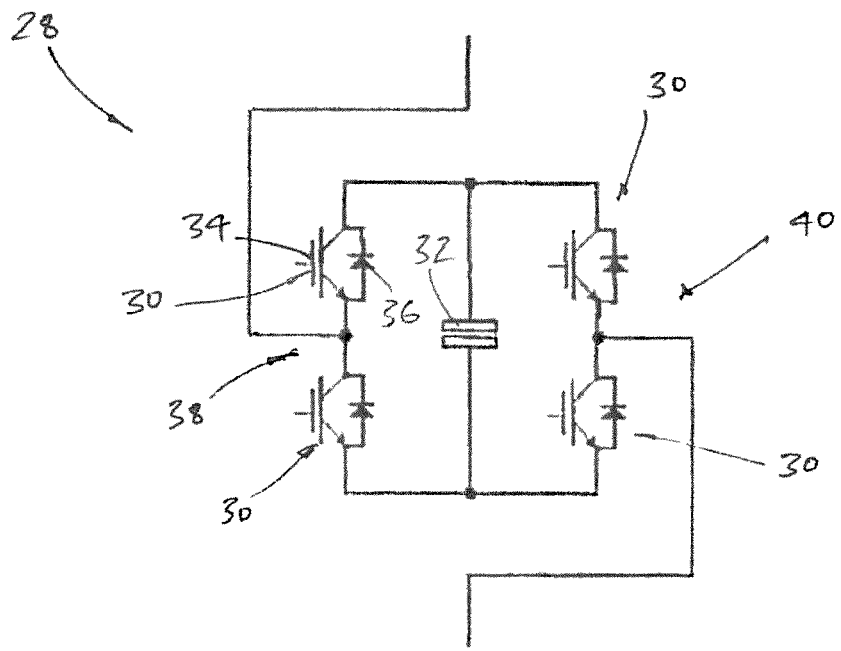
FIG. 2(a) shows a 4-quadrant bipolar sub-module which can form a part of each of the chain-link converters shown in FIG. 1.
Figure 2B:
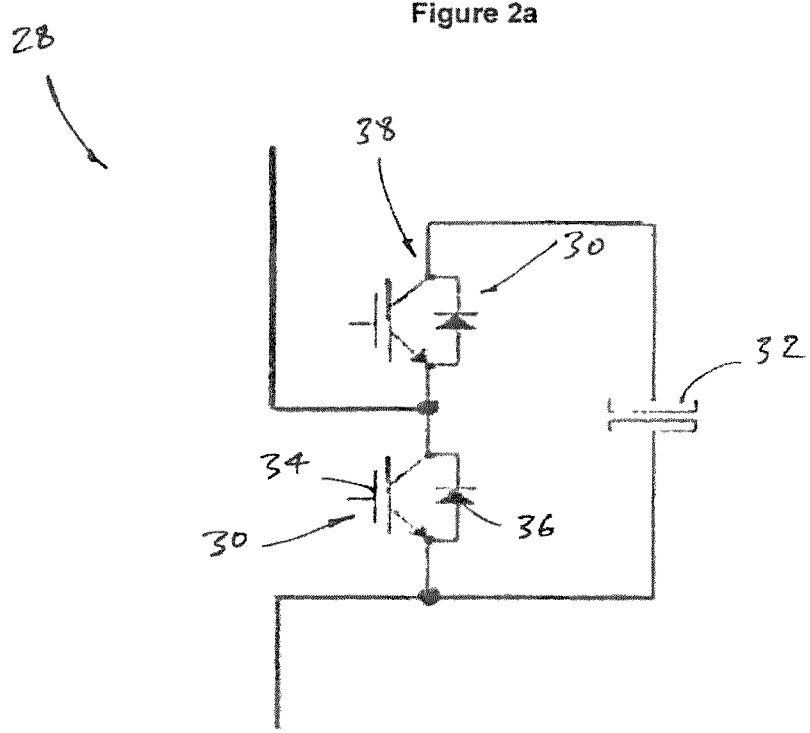
FIG. 2(b) shows a 2-quadrant unipolar sub-module which can form a part of each of the chain-link converters shown in FIG. 1.

An electrical apparatus according to a first embodiment of the invention is designated generally by reference numeral 50.

The electrical apparatus 50 includes a chain-link converter 24 which, in turn, includes a plurality of chain-link sub-modules 28, each of which is operable to provide a voltage source.

The electrical apparatus 50 also includes a switching control unit 52 to control each of the various chain-link sub-modules 28, and to this end the switching control unit 52 is operatively interconnected with each chain-link sub-module 28 by an electromagnetic radiation conduit 54. In the embodiment shown, the switching control unit 52 is operatively interconnected directly with each chain-link sub-module 28 by an electromagnetic radiation conduit 54.

More particularly, in the embodiment shown, the chain-link sub-modules 28 are arranged in respective groups, each of which defines a chain-link module 26. The number of chain-link sub-modules 28 in each group is eight, but in other embodiments of the invention (not shown) one or more such groups, i.e. one or more such chain-link modules 26, may include fewer than or greater than eight sub-modules 28.

The electromagnetic radiation conduits 54 that extend between the switching control unit 52 and each chain-link module 26 are similarly arranged into corresponding first, second, third, fourth, fifth and sixth groups 56a, 56b, 56c, 56d, 56e, 56f of electromagnetic radiation conduits 54.

The electromagnetic radiation conduits 54 within a respective group 56a, 56b, 56c, 56d, 56e, 56f have the same length as one another, and this length is different to the length of the electromagnetic radiation conduits 54 within each of the other groups 56a, 56b, 56c, 56d, 56e, 56f of electromagnetic radiation conduits 54.

In other embodiments of the invention, the electromagnetic radiation conduits 54 within a respective group 56a, 56b, 56c, 56d, 56e, 56f may have different lengths to one another, but may fall within a discrete range of lengths which differs from the discrete range of lengths of the electromagnetic radiation conduits 54 within each of the other groups 56a, 56b, 56c, 56d, 56e, 56f of electromagnetic radiation conduits 54.

In still further embodiments of the invention the electromagnetic radiation conduit 54 between each chain-link sub-module 28 and the switching control unit 52 may have a unique length which differs from the length of each of the other such electromagnetic radiation conduits 54.

Figure 3:
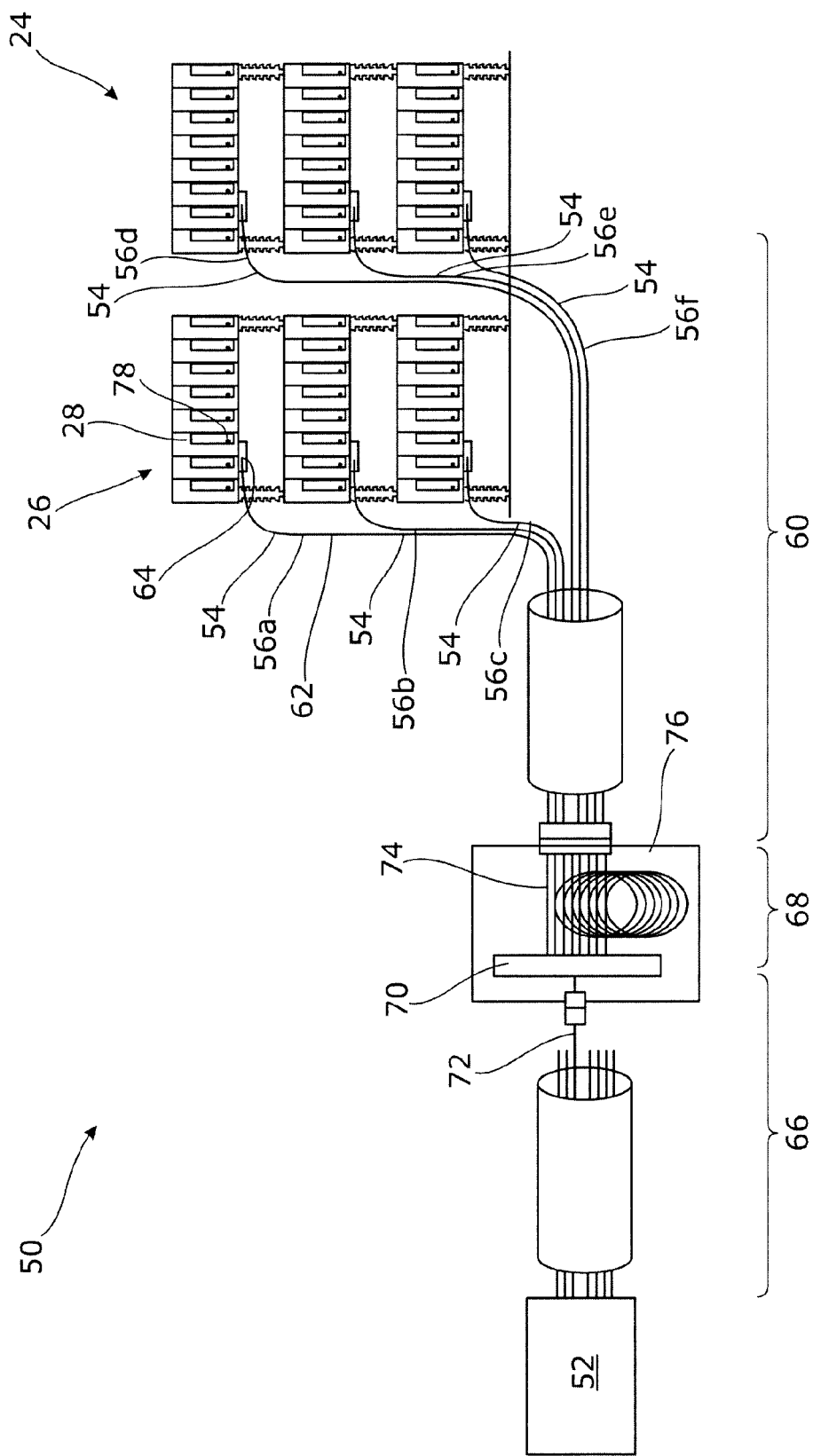
FIG. 3 shows a schematic view of an electrical apparatus according to a first embodiment of the invention.

Returning to the embodiment shown in FIG. 3, the electromagnetic radiation conduits 54 within each group 56a, 56b, 56c, 56d, 56e, 56f of electromagnetic radiation conduits 54 share a common visual identifier which is different to the common visual identifier of each of the other groups 56a, 56b, 56c, 56d, 56e, 56f. In the embodiment shown the common visual identifier is a sleeve of a particular colour which envelops the corresponding electromagnetic radiation conduits 54. For example, the first group 56a of electromagnetic radiation conduits 54 each has a dark red sleeve, the second group 56b a light red sleeve, the third group 56c an orange sleeve, the fourth group 56d a yellow sleeve, the fifth group 56e a green sleeve, and the sixth group 56f a blue sleeve.

Other visual identifiers, such as different coloured rings or stripes, or combinations of different coloured rings or stripes are, however, also possible. Moreover, in other embodiments of the invention (not shown) each individual electromagnetic radiation conduit 54 may include a unique visual identifier, e.g. in the form of a unique combination of different coloured rings or strips.

Each electromagnetic radiation conduit 54 includes a first conduit portion 58 which is operatively connected to the switching control unit 52, and a second conduit portion 60 which extends towards a corresponding chain-link sub-module 28.

Each second conduit portion 60 has the same length.

In the embodiment shown, each second conduit portion 60 is made up of a first fibre optic cable 62, which is optically coupled to a first optical splitter 64 that is secured to the corresponding chain-link module 26, and a plurality of same-length second fibre optic cables (not shown) each of which extends between the first optical splitter 64 and a respective chain-link sub-module 28 of the corresponding chain-link module 26. In this manner the various fibre optic cables 62 define part of a passive optical network (PON).

In the context of the application, a PON is a network in which an electromagnetic signal received by a receiving module, e.g. a chain-link sub-module 28, is not actively repeated, i.e. converted to an electrical signal and passed to an optical transmitter for retransmission, and thereby passed on to a further receiving module in order for the network to operate.

More specifically, the PON in the invention uses a light splitter, e.g. the first optical splitter 64, to split a received electromagnetic signal into a plurality of electromagnetic signals by an unpowered, i.e. passive, optical means. The split electromagnetic signals are then each transmitted to a given one of the chain-link sub-modules 28 within the chain-link converter 24, with each chain-link sub-module 28 having to take no further part in propagating the said electromagnetic signal.

Such passive propagation of the electromagnetic signal is particularly beneficial in relation to, e.g. voltage source converters, because the associated passive optical splitter is reliable, wholly unaffected by the high electrical and magnetic fields present in such converters, and is already galvanically isolated.

The first optical splitter 64 may share a common visual identifier, i.e. colour indication, with the corresponding group 56a, 56b, 56c, 56d, 56e, 56f of electromagnetic radiation conduits 54 to which it is optically coupled.

Other embodiments of the invention may omit the first optical splitter 64, and hence also omit a common first fibre optic cable 62, and instead include second conduit portions 60 of electromagnetic radiation conduits 54 which are made up of a single, discrete fibre optic cable which is optically coupled directly to a respective chain-link sub-module 28.

Furthermore, different types of electromagnetic radiation conduit may also be utilised.

In the meantime, each first conduit portion 58 of each electromagnetic radiation conduit 54 has a length which is selected to define the difference in overall length of the electromagnetic radiation conduits 54 within the corresponding group 56a, 56b, 56c, 56d, 56e, 56f of electromagnetic radiation conduits 54 compared to the overall length of the electromagnetic radiation conduits 54 within each of the other groups 56a, 56b, 56c, 56d, 56e, 56f.

More particularly, in the embodiment shown, each first conduit portion 58 includes a main portion 66 and an interconnecting portion 68 which are separated by a second optical splitter 70. The main portion 66 is made up of a single, third fibre optic cable 72 which is common to each of a plurality of fourth fibre optic cables 74 which make up the interconnecting portion 68, and which correspond to (and are optically coupled with) a respective first fibre optic cable 62.

Each fourth fibre optic cable 74 has a different length to the other fourth fibre optic cables 74, e.g. 0 m (i.e. substantially no interconnecting portion 68), 3 m, 6 m, 9 m, —m, 15 m, 18 m, 21 m. In this manner the length of each respective interconnecting portion 68, i.e. each fourth fibre optic cable 74, defines the difference in overall length of the corresponding group 56a, 56b, 56c, 56d, 56e, 56f of electromagnetic radiation conduits 54 compared to the overall length of the electromagnetic radiation conduits 54 within each of the other groups 56a, 56b, 56c, 56d, 56e, 56f.

In this manner the various third and fourth fibre optic cables 72, 74 define a further part of the aforementioned PON.

Each of the different-length fourth fibre optic cables 74 is usefully retained in a conduit housing 76, such as a storage or inspection cabinet, or the like.

In addition to the foregoing, each chain-link sub-module 28 includes a fault indicator 78 in the form of a visible indicator, e.g. a light or other visible flag. The visible indicator is non-volatile and bi-stable so that its visible indication can be retained even when the associated chain-link sub-module 28, and/or its neighbouring sub-modules 28, has been discharged to permit safe access by a maintenance operative to a faulty sub-module 28.

In other embodiments of the invention (not shown) a group of sub-modules 28 which together define a chain-link module 26 may include a single fault indicator which is common to the said group.

In use, in the event of a given chain-link sub-module 28 developing a fault and thus requiring repair or replacement, the switching control unit 52 propagates an electromagnetic signal, e.g. a visible, infra-red, or microwave pulse or message, through the electromagnetic conduit 54 which interconnects the switching control unit 52 and the faulty chain-link sub-module 28.

The switching control unit 52 then determines the time taken for the electromagnetic signal to propagate through the said electromagnetic radiation conduit 54.

Thereafter the switching control unit 52 identifies the approximate physical location of the faulty chain-link sub-module 28, i.e. to within the area of a corresponding group of chain-link sub-modules 28, i.e. to within the corresponding chain-link module 26, according to the time taken for the electromagnetic signal to propagate through the said electromagnetic radiation conduit 54.

More specifically, the switching control unit 52 equates the time taken for such electromagnetic signal propagation to a physical length of the corresponding electromagnetic radiation conduit 54, and in turn correlates this physical length to a specific physical location within the spatial arrangement of the chain-link converter 24. Such steps are possible because the different groups 56a, 56b, 56c, 56d, 56e, 56f of electromagnetic radiation conduits 54 each have a different length and so the difference in time taken for an electromagnetic signal to propagate through the electromagnetic radiation conduits 54 of each group 56a, 56b, 56c, 56d, 56e, 56f is discernable by the switching control unit 52.

The switching control unit 52 then indicates to a maintenance operative the physical location of the faulty chain-link sub-module 28, and additionally activates the fault indicator 78 on the sub-module 28 so that the maintenance operative is able readily to identify the sub-module 28 once he or she has moved to a location, e.g. within an associated VSC converter valve hall, corresponding to the physical location of the faulty sub-module 28.

In addition, or alternatively, a fault chain-link sub-module 28 may itself activate the fault indicator 78 in response to it detecting a fault.

In any such case, preferably the fault indicator 78 remains active after the voltage level on the faulty chain-link sub-module 28 and the associated chain-link module 26 has been reduced to a safe level required for the subsequent maintenance operation.

The invention claimed is:

1. An electrical apparatus comprising:
    a chain-link converter including a plurality of chain-link sub-modules each of which is operable to provide a voltage source; and
    a switching control unit to control the chain-link sub-modules, the switching control unit being operatively interconnected with each chain-link sub-module by an electromagnetic radiation conduit, the length of the electromagnetic radiation conduit between the switching control unit and at least one chain-link sub-module differing from the length of the electromagnetic radiation conduit between the switching control unit and at least one other chain-link sub-module, and the switching control unit being configured to:
        propagate an electromagnetic signal through each different-length electromagnetic radiation conduit;
        determine a difference in time taken for the electromagnetic signal to propagate through each different-length electromagnetic radiation conduit; and
        identify the or each chain-link sub-module associated with each different-length electromagnetic radiation conduit according to the time taken for the electromagnetic signal to propagate through each different-length electromagnetic radiation conduit.

2. The electrical apparatus according to claim 1 wherein each chain-link sub module is operatively interconnected with the switching control unit by an electromagnetic radiation conduit which has a different length to each of the other electromagnetic radiation conduits.

3. The electrical apparatus according to claim 2 wherein the chain-link sub modules are arranged in respective groups each of which group defines a chain-link module, the electromagnetic radiation conduits extending between the switching control unit and each respective chain-link module being arranged in a corresponding group of electromagnetic radiation conduits, and the length of each electromagnetic radiation conduit within a respective said group of electromagnetic radiation conduits falling within a discrete range of lengths which differs from the discrete range of lengths of the electromagnetic radiation conduits within the or each other group of electromagnetic radiation conduits.

4. The electrical apparatus according to claim 1 wherein the chain-link sub modules are arranged in respective groups each of which group defines a chain-link module, the electromagnetic radiation conduits extending between the switching control unit and each respective chain-link module being arranged in a corresponding group of electromagnetic radiation conduits, the electromagnetic radiation conduits within a respective said group of electromagnetic radiation conduits having the same length which differs from the length of the electromagnetic radiation conduits within the or each other group of electromagnetic radiation conduits.

5. The electrical apparatus according to claim 1 wherein each electromagnetic radiation conduit includes a unique visual identifier.

6. The electrical apparatus according to claim 3 wherein the electromagnetic radiation conduits in each respective group of electromagnetic radiation conduits shares a common visual identifier, the common visual identifier of one group differing from the common visual identifier of the or each other group of electromagnetic radiation conduits.

7. The electrical apparatus according to claim 1 wherein each electromagnetic radiation conduit includes a first conduit portion operatively connected to the switching control unit and a second conduit portion extending towards a corresponding chain-link sub-module, whereby the second conduit portions have the same length as one another while each first conduit portion has a length selected to define the difference in overall length of the given electromagnetic radiation conduit relative to one or more other electromagnetic radiation conduits.

8. The electrical apparatus according to claim 7 wherein each first conduit portion includes a main portion and an interconnecting portion, the main portions having the same length as one another while each interconnecting portion has a length selected to define the difference in overall length of the corresponding electromagnetic radiation conduit relative to one or more other electromagnetic radiation conduits.

9. The electrical apparatus according to claim 3 wherein each chain-link module includes at least one fault indicator.

10. The electrical apparatus according to claim 1 wherein each chain-link sub-module includes a fault indicator.

11. A method of identifying the location of a chain-link sub-module in an electrical apparatus comprising a chain-link converter having a plurality of chain-link sub-modules each of which is operable to provide a voltage source and a switching control unit to control the chain-link sub-modules, the method comprising the steps of:
    (a) operatively interconnecting an electromagnetic radiation conduit between the switching control unit and each chain-link sub-module, the length of the electromagnetic radiation conduit between the switching control unit and at least one chain-link sub-module differing from the length of the electromagnetic radiation conduit between the switching control unit and at least one other chain-link sub-module;
    (b) propagating an electromagnetic signal through a given different-length electromagnetic radiation conduit;
    (c) determining the time taken for the electromagnetic signal to propagate through the given different-length electromagnetic radiation conduit; and
    (d) identifying the or each chain-link sub-module associated with the given different-length electromagnetic radiation conduit according to the time taken for the electromagnetic signal to propagate through the given different-length electromagnetic radiation conduit.

* * * * *